United States Patent
Hirotsu

(10) Patent No.: US 10,049,578 B2
(45) Date of Patent: Aug. 14, 2018

(54) TRAVEL COMMAND GENERATION DEVICE

(71) Applicant: Hitachi, Ltd., Chiyoda-ku, Tokyo (JP)

(72) Inventor: Teppei Hirotsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/578,445

(22) PCT Filed: Jun. 13, 2016

(86) PCT No.: PCT/JP2016/067472
§ 371 (c)(1),
(2) Date: Nov. 30, 2017

(87) PCT Pub. No.: WO2017/002590
PCT Pub. Date: Jan. 5, 2017

(65) Prior Publication Data
US 2018/0151076 A1    May 31, 2018

(30) Foreign Application Priority Data
Jun. 29, 2015   (JP) ................. 2015-129456

(51) Int. Cl.
*G08G 1/16*   (2006.01)
*B60W 30/09*   (2012.01)

(52) U.S. Cl.
CPC ............. *G08G 1/166* (2013.01); *B60W 30/09* (2013.01)

(58) Field of Classification Search
CPC .... B60W 30/08; B60W 30/09; B60W 30/095; B60W 30/0953; B60W 30/0956; B60W 50/0097; G08G 1/16; G08G 1/166
See application file for complete search history.

(56) References Cited

U.S. PATENT DOCUMENTS

| 2010/0274435 A1* | 10/2010 | Kondoh ................ B60W 40/09 701/31.4 |
| 2012/0022716 A1* | 1/2012 | Kitahama ............... G01C 21/34 701/1 |

(Continued)

FOREIGN PATENT DOCUMENTS

| JP | 2008-158969 A | 7/2008 |
| JP | 2008158969 A * | 7/2008 |

(Continued)

OTHER PUBLICATIONS

International Search Report (PCT/ISA/210) issued in PCT Application No. PCT/JP2016/067472 dated Oct. 4, 2016 with English-language translation (Four (4) pages).

(Continued)

*Primary Examiner* — Laura Nguyen
(74) *Attorney, Agent, or Firm* — Crowell & Moring LLP

(57) ABSTRACT

Provided is a travel command generation device that generates, on the basis of an existence probability distribution for a plurality of obstacles, travel commands to avoid collision between the plurality of obstacles and a host vehicle, wherein the speed of collision probability computation is enhanced. On the basis of the existence probability distribution for the plurality of obstacles, a collision probability table is generated, for which a movement distance L on a fixed trajectory and a time T are input and the probabilities of collision between the plurality of obstacles and the host vehicle are output; and on the basis of the collision probability table, travel commands are generated for avoiding collision between the plurality of obstacles and the host vehicle.

5 Claims, 10 Drawing Sheets

(56) References Cited

U.S. PATENT DOCUMENTS

| | | | | |
|---|---|---|---|---|
| 2012/0218093 | A1* | 8/2012 | Yoshizawa | B60R 1/00 340/435 |
| 2014/0063248 | A1 | 3/2014 | Sakagami et al. | |
| 2014/0358841 | A1* | 12/2014 | Ono | G08G 1/0112 706/52 |
| 2016/0152269 | A1* | 6/2016 | Maurer | B60W 30/09 701/41 |

FOREIGN PATENT DOCUMENTS

| | | | |
|---|---|---|---|
| JP | 2013-152551 A | | 8/2013 |
| JP | 2013152551 A | * | 8/2013 |
| JP | 2014-50100 A | | 3/2014 |

OTHER PUBLICATIONS

Japanese-language Written Opinion (PCT/ISA/237) issued in PCT Application No. PCT/JP2016/067472 dated Oct. 4, 2016 (Four (4) pages).

* cited by examiner

TRAVEL COMMAND GENERATION DEVICE

TECHNICAL FIELD

The present invention relates to a travel command generation device for a car or a robot and more particularly to a travel command generation device that computes a travel command to avoid collision at a high speed.

BACKGROUND ART

In recent years, in order to improve the safety of cars, a preventive safety technology has progressed, in which obstacles around a host vehicle are sensed from sensors such as cameras and radars and a warning is displayed or emergency brake is applied to avoid collision when the possibility of collision is judged to be high.

In the preventive safety technology, a future position of an obstacle is predicted to generate a warning display and a collision avoidance command in accordance with the prediction and thus, it is important to improve the prediction accuracy of the future position of the obstacle.

PTL 1 discloses a technology of computing a collision probability in accordance with a future position prediction in consideration of stochastic behavior of an obstacle and displaying a warning to a driver when the possibility of collision is high.

CITATION LIST

Patent Literature

PTL 1: JP 2008-158969 A

SUMMARY OF INVENTION

Technical Problem

In the invention disclosed in PTL 1, the probability of collision between an obstacle and a host vehicle is computed supposing that a driver keeps driving on a lane of the host vehicle at substantially constant speed but, in the case of performing more advanced driving assistance such as automatic travel control, it is necessary to compute the probability of collision between the obstacle and the host vehicle using a plurality of speed profiles of the host vehicle and perform an iterative computation of searching for the optimum speed profile that minimizes the collision probability. In this case, a computation time for a speed command for automatic traveling increases and there is a possibility that the control may not be completed within a certain control cycle.

In view of the above points, it is an object of the present invention to realize a high-speed probability of collision between an obstacle and a host vehicle in automatic travel control.

Solution to Problem

In order to achieve the above object, the present invention is characterized in providing
a travel command generation device that generates, on the basis of an existence probability distribution for a plurality of obstacles, travel commands to avoid collision between the plurality of obstacles and a host vehicle, in which
on the basis of the existence probability distribution for the plurality of obstacles, a collision probability table is generated, for which a movement distance L on a fixed trajectory and a time T are input and the probabilities of collision between the plurality of obstacles and the host vehicle are output and, on the basis of the collision probability table, travel commands are generated to avoid collision between the plurality of obstacles and the host vehicle.

Furthermore, in the present invention, the collision probability table is generated by, in a case where the movement distance L on the fixed trajectory and the time T are input, generating a host vehicle area S when the host vehicle moves by L on the fixed trajectory and calculating an integral value, or an average value, or a maximum value within the host vehicle area S in the existence probability distribution for the plurality of obstacles at the time T.

Furthermore, the present invention searches for a travel command that minimizes an integrated value or a maximum value in the collision probability table during a certain period.

Furthermore, the present invention computes the travel command in parallel by providing a plurality of the collision probability tables.

Advantageous Effects of Invention

According to the present invention, since a computation result of the probability of collision with an obstacle on the fixed trajectory of the host vehicle is reused, the speed of the iterative computation of the collision probability in a search for the optimum travel command of the host vehicle is enhanced.

Furthermore, according to the present invention, since the capacity of the computation result of the collision probability can be made small, a higher-speed computation can be realized by placing the computation result of the collision probability in a compact memory capable of high-speed access.

DESCRIPTION OF EMBODIMENTS

Hereinafter, the configuration and operation of a travel command generation device according to a first embodiment of the present invention will be described with reference to FIGS. 1 to 8.

Figure 1:
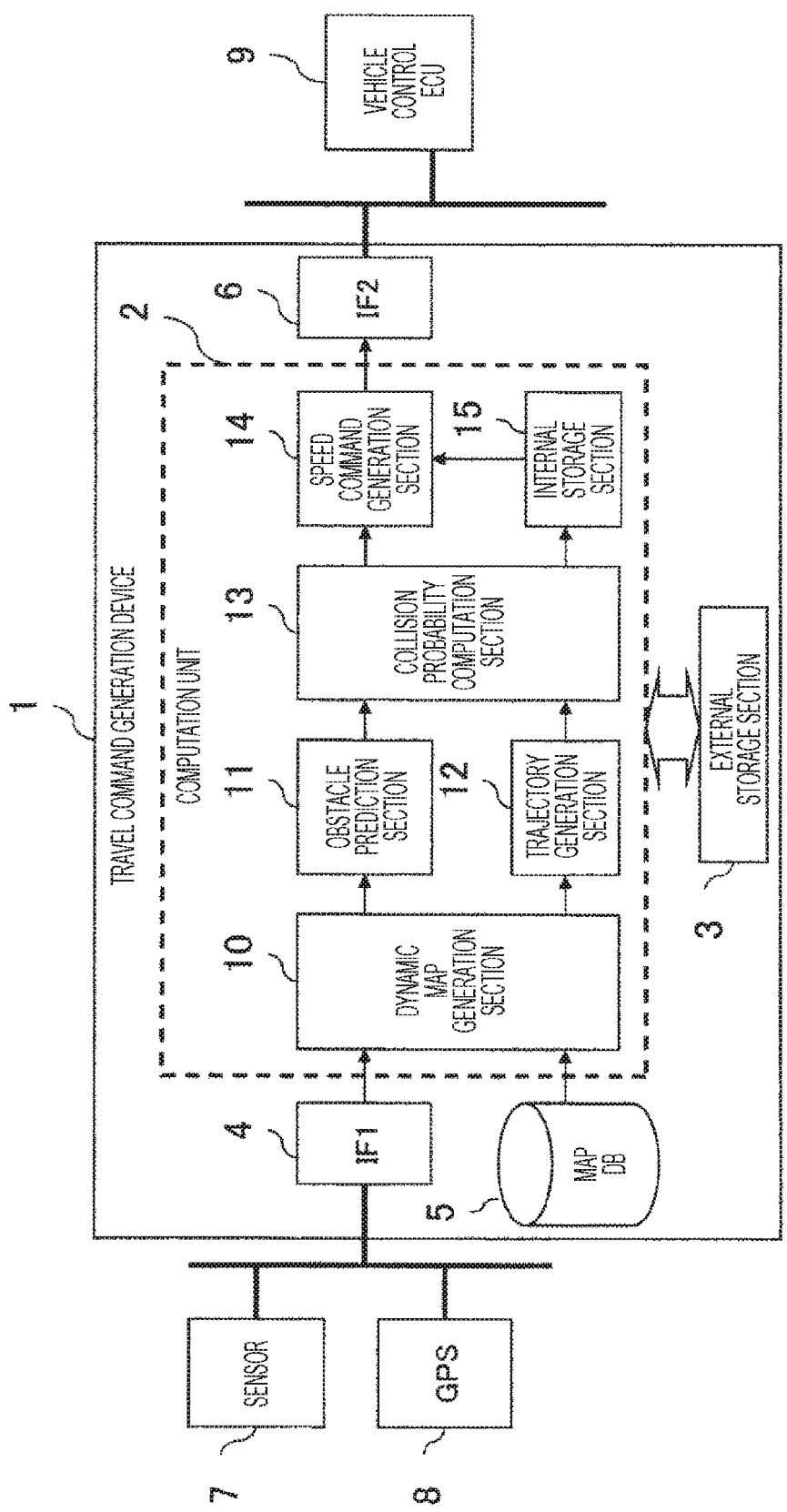
FIG. 1 is an overall block diagram of a travel command generation device according to a first embodiment of the present invention.

FIG. 1 is an overall block diagram of the travel command generation device according to the first embodiment of the present invention.

The travel command generation device (1) accepts input of obstacle information from a sensor (7) and host vehicle information from a GPS (8) via a network and computes a command value necessary for travel control on the basis of the input information to output to a vehicle control ECU (9) via a network. The vehicle control ECU (9) drives various actuators (not illustrated) in accordance with the input command value for travel control to control vehicle motion. Note that the sensor (7) in FIG. 1 is specifically a camera, a radar, or the like and is described in terms of notation as unified one. In addition to the GPS (7), the travel command generation device (1) also accepts input of data from a sensor (not illustrated) that measures the state of a host vehicle to control traveling.

The travel command generation device (1) is composed of an IF 1 (4), a map DB (5), a computation unit (2), an external storage section (3), and an IF 2.

The IF 1 (4) is a physical interface for accepting input of the obstacle information from the sensor (7) and the host vehicle information from the GPS (8) via the network and outputs the input information to the computation unit (2). The map DB (5) is a database in which static map information necessary for travel control is saved and outputs necessary map information to the computation unit (2) in response to a request from the computation unit (2).

The computation unit (2) accepts input of the obstacle information from the sensor (7), the host vehicle information from the GPS (8), and the static map information from the map DB (5) and, on the basis of these items of information, computes the command value necessary for travel control to output a travel command value to the vehicle control ECU (9) via the network.

Specifically, the computation unit (2) is implemented as a semiconductor chip such as a microprocessor or an FPGA.

The computation unit (2) saves intermediate data of a size that cannot be saved within the computation unit to the external storage section (3). Specifically, the external storage section (3) is implemented as a semiconductor memory such as an SDRAM.

The IF 2 (6) is a physical interface for outputting the travel command value computed by the computation unit (2) via the network.

The computation unit (2) is composed of functions of a dynamic map generation section (10), an obstacle prediction section (11), a trajectory generation section (12), a collision probability computation section (13), and a speed command generation section (14), and an internal storage section (15). The respective functions of the dynamic map generation section (10), the obstacle prediction section (11), the trajectory generation section (12), the collision probability computation section (13), and the speed command generation section (14) are implemented as software or hardware.

Figure 2:
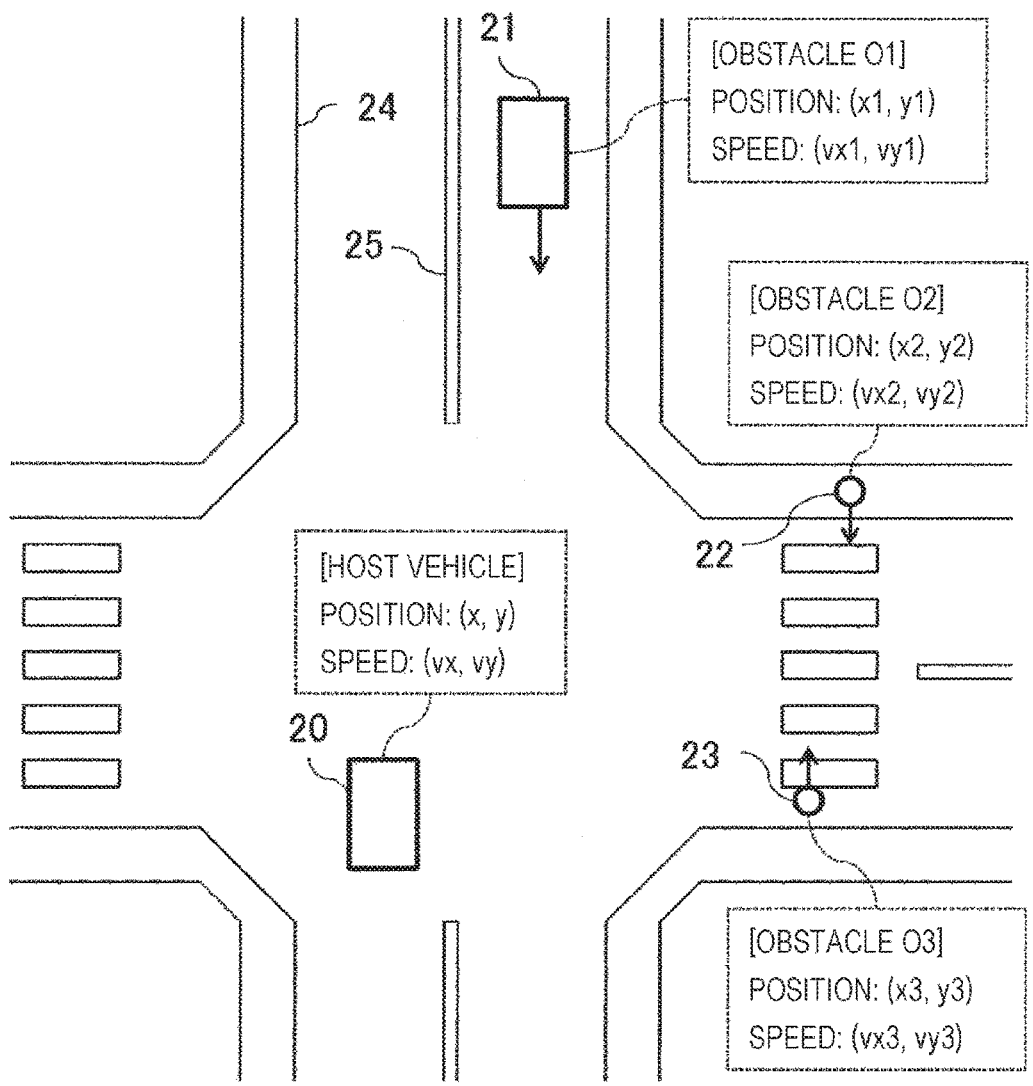
FIG. 2 is a conceptual diagram of a dynamic map generated by a dynamic map generation section (10) according to the first embodiment of the present invention.

The dynamic map generation section (10) accepts input of the obstacle information from the sensor (7), the host vehicle information from the GPS (8), and the static map information from the map DB (5) and integrates these items to generate a dynamic map necessary for travel control. FIG. 2 is a conceptual diagram of the dynamic map generated by the dynamic map generation section (10), illustrating an example of an intersection. By integrating the obstacle information from the sensor (7), the host vehicle information from the GPS (8), and the static map information from the map DB (5), a dynamic database of the position and the speed of a host vehicle (20), the position of a walkway (24), the position of a white line (25), the positions and the speeds of obstacles O1 to 3 (21) to (23) is generated and held in the external storage section (3).

Figure 3:
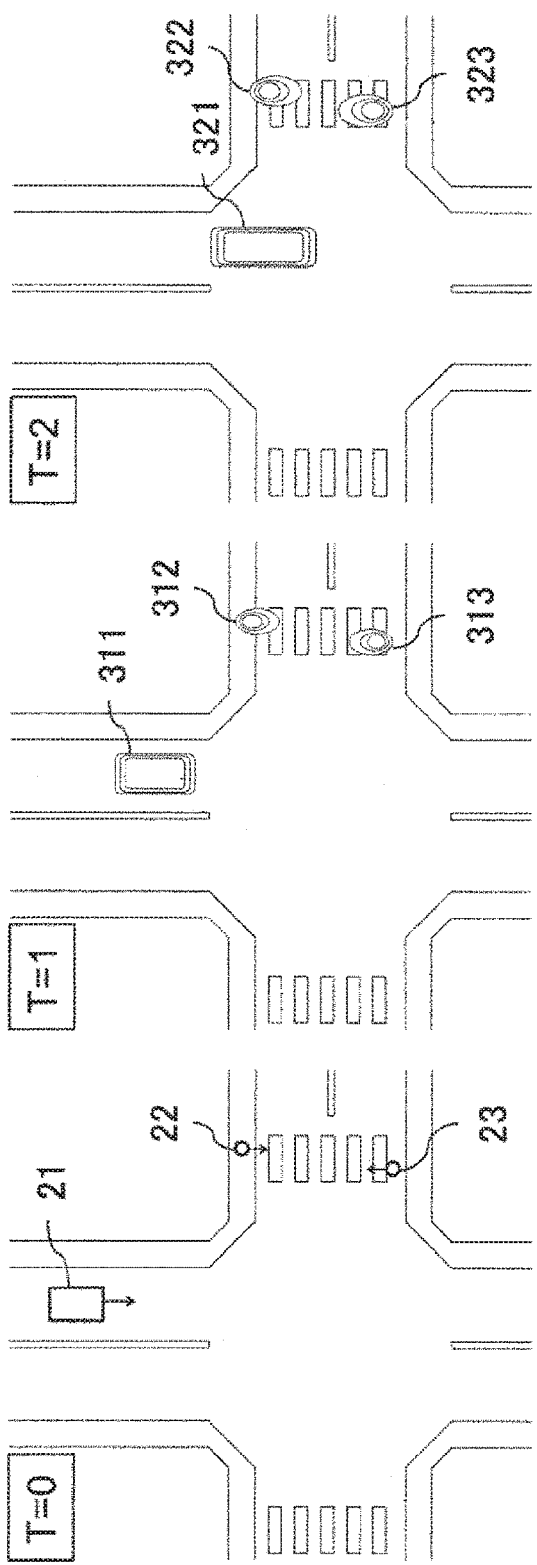
FIG. 3 is a conceptual diagram of prediction of an existence probability distribution for obstacles generated by an obstacle prediction section (11) according to the first embodiment of the present invention.

The obstacle prediction section (11) extracts the obstacle information from the dynamic map generated by the dynamic map generation section (10) and predicts an existence probability distribution for obstacles. FIG. 3 illustrates prediction results of the existence probability distribution using the obstacles O1 to 3 (21) to (23) in the dynamic map illustrated in FIG. 2 as an example. In a frame of T=0 (s), an initial position of each obstacle is indicated in accordance with information from sensor data. Next, in a frame of T=1 (s), considering speed information from the sensor data and stochastic behaviors, the existence probability distribution moves in a velocity direction and diffuses spatially, where respective existence probability distributions corresponding to the obstacles O1 to 3 (21) to (23) are indicated as (311) to (313). Finally, in a frame of T=2 (s), the existence probability distribution moves further in the velocity direction and diffuses spatially from the frame of T=1 and respective existence probability distributions corresponding to the obstacles O1 to 3 (21) to (23) are indicated as (321) to (323). Note that FIG. 3 illustrates the existence probability distribution for the obstacles in each frame of T=0, 1, and 3 (s) but, in fact, the existence probability distribution for the obstacles is generated at a finer time step $\Delta T$, for example, at an interval of $\Delta T=0.1$ (s). Data of the existence probability distribution for the obstacles generated here is saved to the external storage section (3) as necessary.

Figure 4:
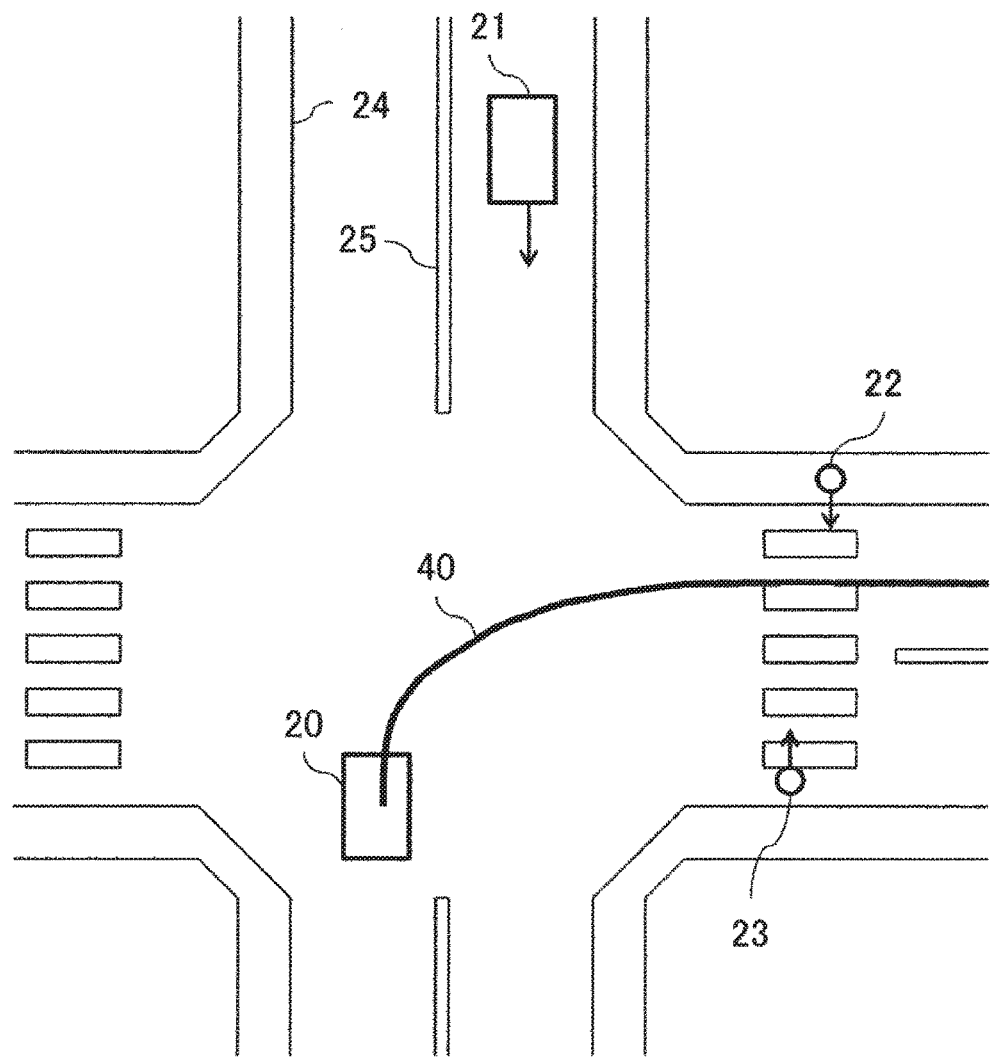
FIG. 4 is a conceptual diagram of a host vehicle trajectory generated by a trajectory generation section (12) according to the first embodiment of the present invention.

The trajectory generation section (12) extracts the shape of a road and information on a route to a destination from the dynamic map generated by the dynamic map generation section (10) and generates a fixed trajectory to be passed by the host vehicle in the near future, for example, within 10 (s). FIG. 4 is an example of the fixed trajectory to be passed by the host vehicle on the dynamic map illustrated in FIG. 2. FIG. 4 illustrates an example in which the host vehicle turns right and a trajectory (40) passing through near the center of the intersection and the center of a right lane after the right turn is generated.

The collision probability computation section (13) uses the existence probability distribution for the obstacle output by the obstacle prediction section (11) and the fixed route output by the trajectory generation section (12) to generate a collision probability table for which the movement distance L on the fixed trajectory and the time T are input and the probability of collision between the obstacle and the host vehicle is output.

Figure 5:
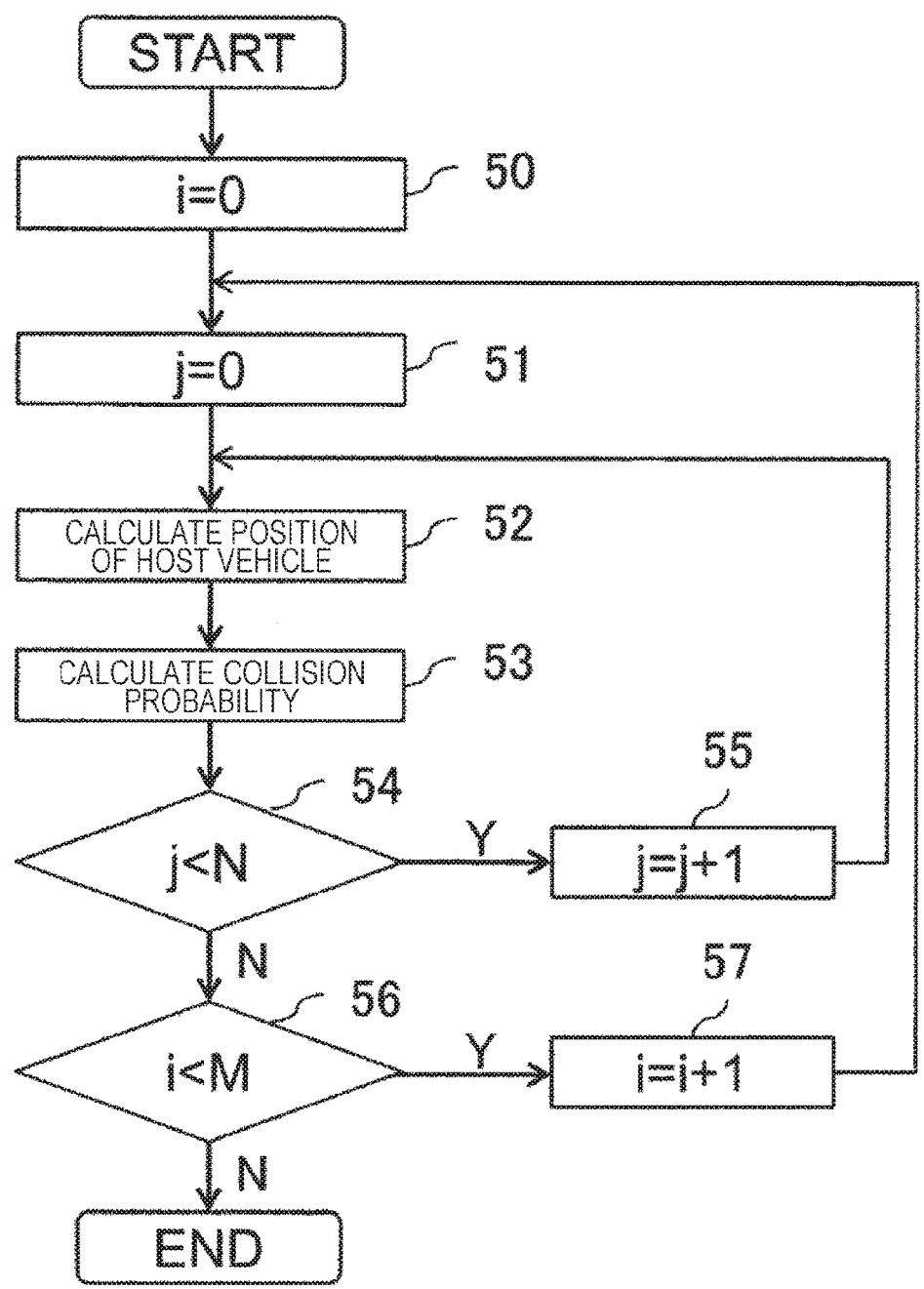
FIG. 5 is a flowchart of a collision probability computation section (13) according to the first embodiment of the present invention.

FIG. 5 is a flowchart illustrating processing of the collision probability computation section (13).

First, in processing step (50), a variable i for a time loop is initialized.

Next, in processing step (51), a variable j for a movement distance loop of the host vehicle on the fixed trajectory is initialized.

Figure 6:
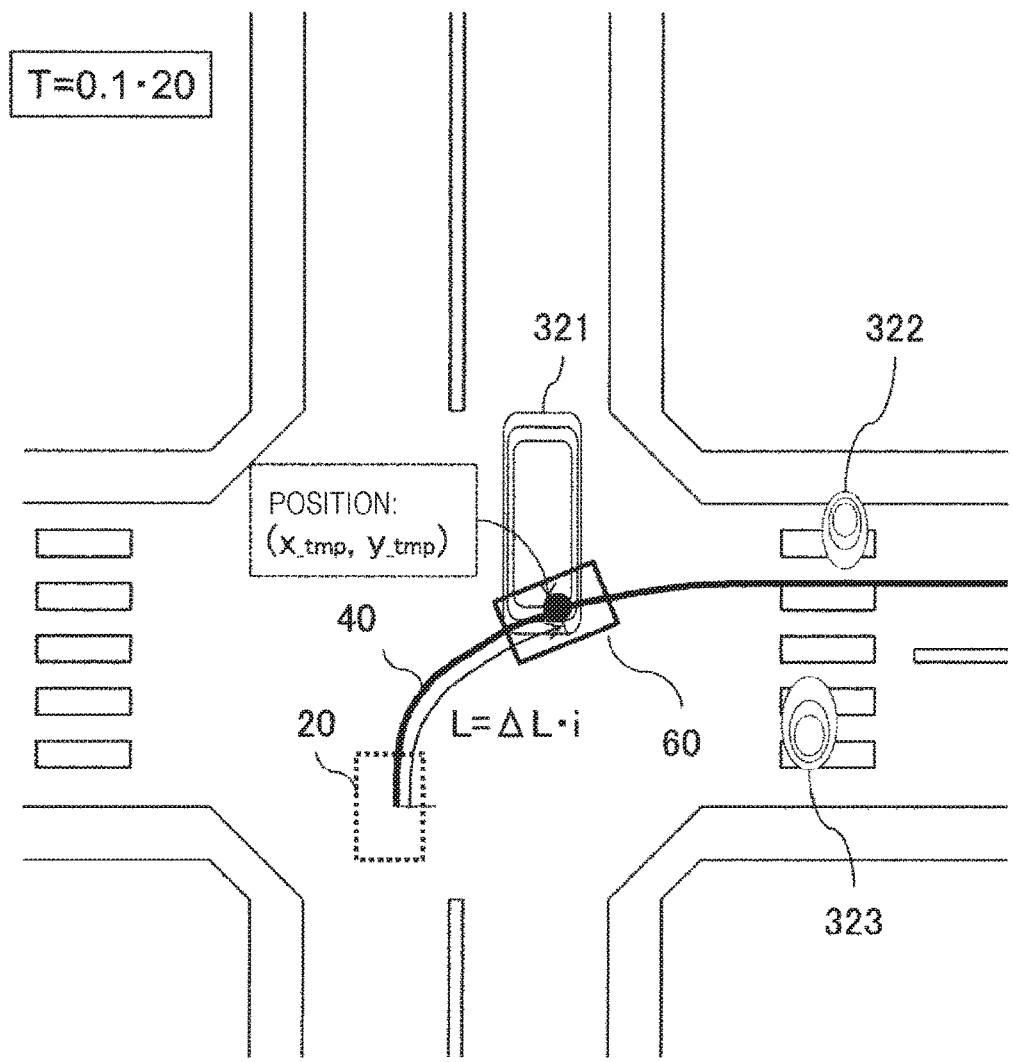
FIG. 6 is an explanatory diagram fora computation method for a collision probability computation step (53) of the flowchart illustrated in FIG. 5.

Next, in processing step (52), the position of the host vehicle on the fixed trajectory is calculated. FIG. 6 illustrates a method of calculating the position of the host vehicle on the fixed trajectory. In this processing step, the movement distance of the host vehicle on the fixed trajectory is computed first using L=ΔL·j. Next, on the basis of the two-dimensional shape of the fixed trajectory, the position of the host vehicle (x_tmp, y_tmp) at the time of moving by L on the fixed trajectory is computed.

Next, in processing step (53), the probability of collision between an obstacle and the host vehicle in the case of moving by L=ΔL·j on the fixed trajectory is calculated in a time frame of T=ΔT·i. FIG. 6 illustrates a method of calculating the collision probability in a time frame of T=2. First, a host vehicle area S (60) centered on the position of the host vehicle (x_tmp, y_tmp) is generated. Next, by integrating a collision probability distribution within the host vehicle area S, the collision probability is calculated. Note that the collision probability may be computed using a maximum value of the collision probability within the host vehicle area S or an average value of the collision probability within the host vehicle area S.

Next, in processing step (54), the end of the movement distance loop is determined. If processing step (52) and processing step (53) are executed up to a predetermined movement distance maximum value (ΔL·N), this loop is exited. Otherwise, j is incremented (55) and the processing returns to processing step (52).

Next, in processing step (55), the end of the time loop is determined. If processing step (52) and processing step (53) are executed up to a predetermined time maximum value (ΔT·M), this loop is exited and all processing is ended. Otherwise, i is incremented (57) and the processing returns to processing step (51).

Figure 7:
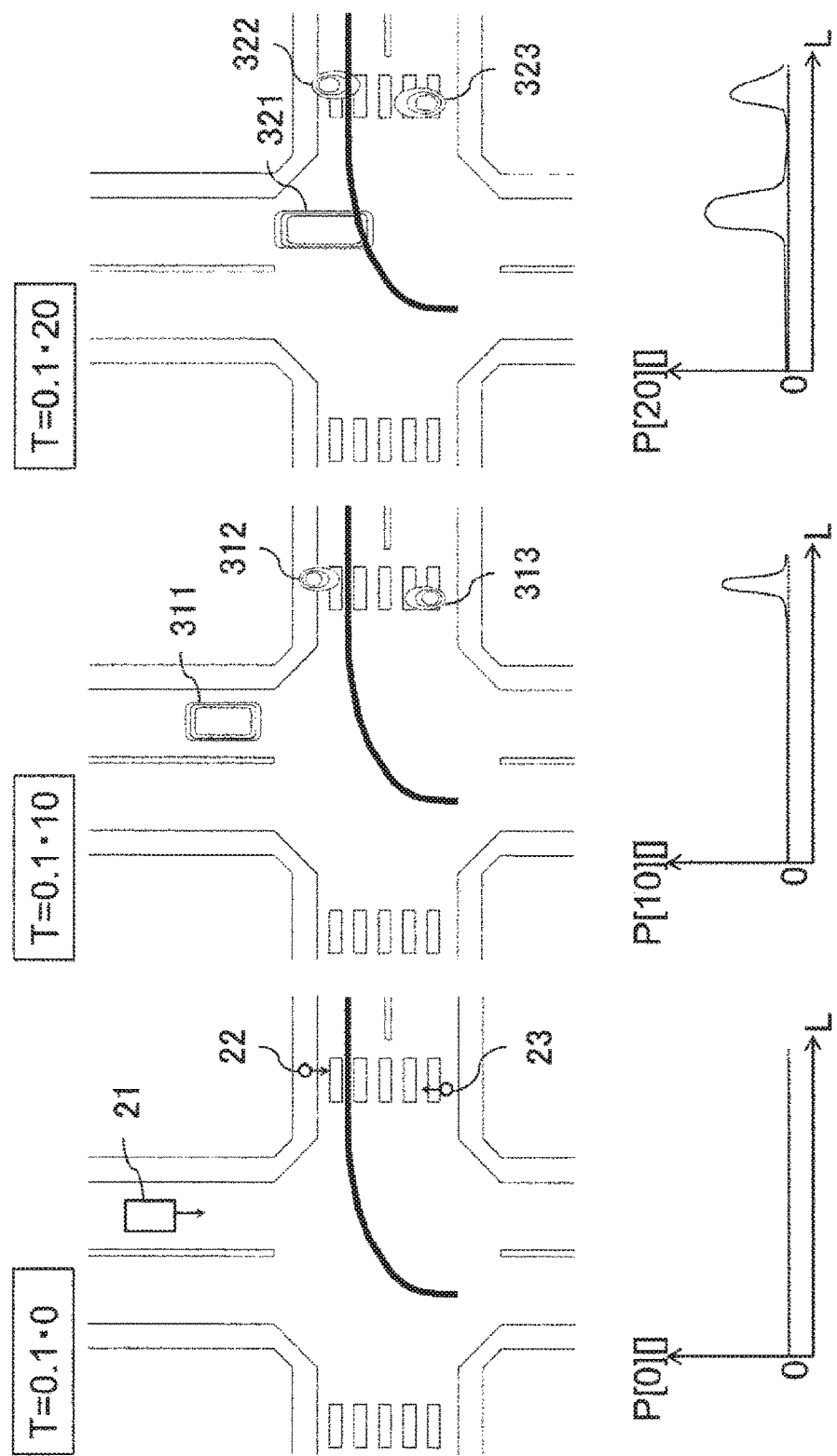
FIG. 7 is a conceptual diagram of a collision probability table output by the collision probability computation section (13) according to the first embodiment of the present invention.

When the processing illustrated in FIG. 5 is all completed, the collision probability table P[i][j] for the obstacle and the host vehicle in a case where the host vehicle moves by L=ΔL·j on the fixed trajectory at the time ΔT·i (i=0, ..., M) is generated. FIG. 7 illustrates an example of the collision probability table P[i][ ] ( ) (i=0, 10, 20). P[i][j] is saved to the internal storage section (15) capable of high-speed access for a high-speed computation of the travel command value. Specifically, the internal storage section (15) is implemented as an SRAM in a semiconductor chip.

Figure 8:
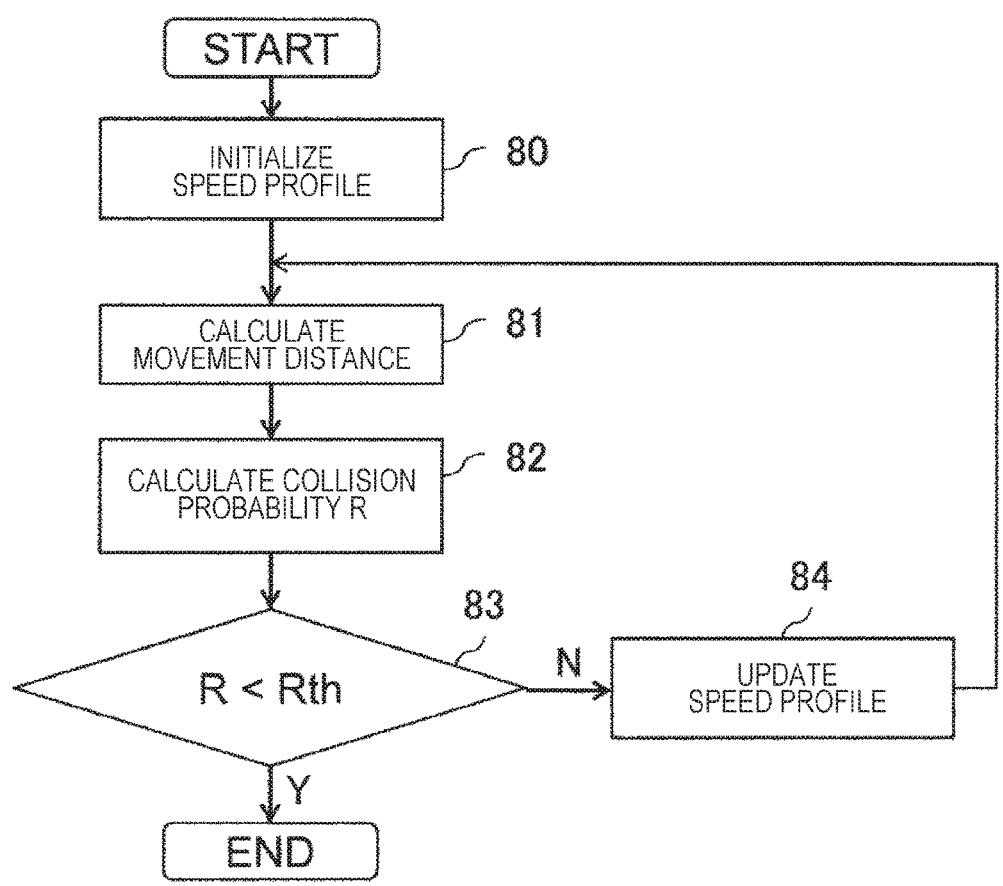
FIG. 8 is a flowchart of a speed command generation section (14) according to the first embodiment of the present invention.

FIG. 8 is a flowchart illustrating processing of the speed command generation section (14).

First, in processing step (80), a speed profile to be output is initialized. The speed profile is a speed command value string extending from the present to the future within a specific period and is saved in a matrix of V[i] (i=0, ..., M). In addition, a time increment is the same as that used by the collision probability computation section (13), that is, ΔT.

Next, in processing step (81), the movement distance on the fixed route extending from the present to the future within a specific period is computed. Assuming that the matrix in which the movement distance is saved is L1[i] (i=0, ..., M), calculation can be performed using the speed profile as follows.

$$L1[i+1]=L1[i]+V[i]\cdot \Delta T$$

Next, in processing step (82), a collision probability R for the obstacle and the host vehicle is calculated. The collision probability at the time ΔT·i and the movement distance ΔL·j (j=0, ..., N) is computed in advance by the collision probability computation section (13) and maintained as a table in the internal storage section (15), whereby it is possible to compute an ultimate R at high speed by reading corresponding table data at each time to add.

Next, in processing step (83), whether the collision probability R is smaller than a threshold value Rth is determined. In a case where the collision probability R is smaller than the threshold value Rth as a result of the determination, it is determined that no collision with the obstacle occurs when the host vehicle travels using that speed profile and the processing is ended. In a case where the collision probability R is larger than the threshold value Rth, there is a possibility of occurrence of a collision with the obstacle when the host vehicle travels using that speed profile. Accordingly, the speed profile is updated (84) and the processing returns to processing step (81). Note that various algorithms used in optimization problems are applied to the update of the speed profile in processing step (84), such as sequential quadratic programming, a genetic algorithm, and an artificial bee colony algorithm. With the processing above, the speed profile V[i] (i=0, ..., M) to avoid collision with an obstacle can be computed at high speed.

Finally, a first value V[0] of the speed profile is selected as a speed command value and transmitted to the vehicle control ECU via the network within a specific control cycle.

Hereinafter, the operation of a travel command generation device according to a second embodiment of the present invention will be described with reference to FIG. 9. Note that the configuration and operation of the travel command generation device according to the second embodiment of the present invention are the same as those of the first embodiment except for the operation of a collision probability computation section (13) and accordingly, the description of the same portions will be omitted.

Figure 9:
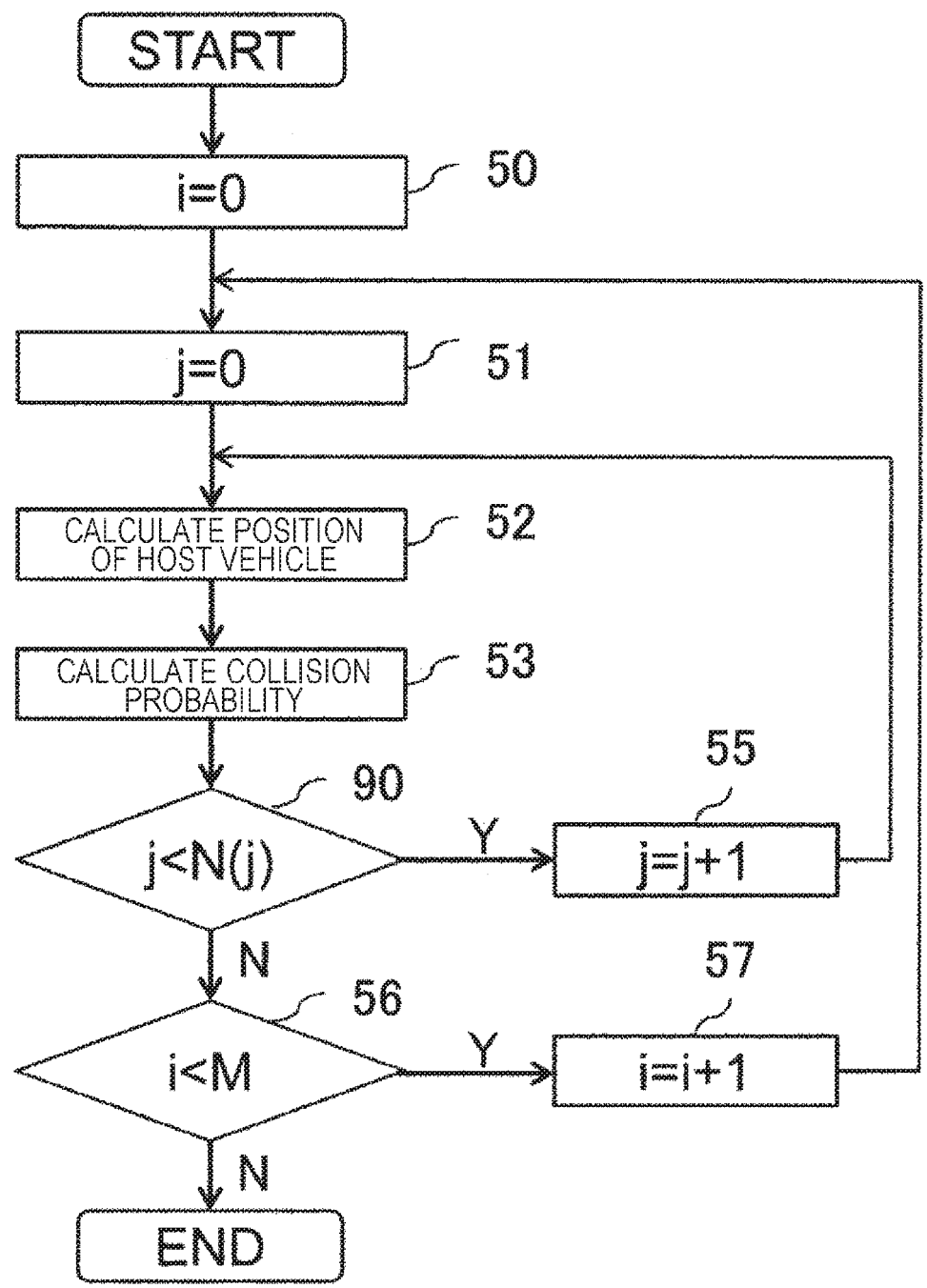
FIG. 9 is a flowchart of a collision probability computation section (13) according to a second embodiment of the present invention.
Figure 10:
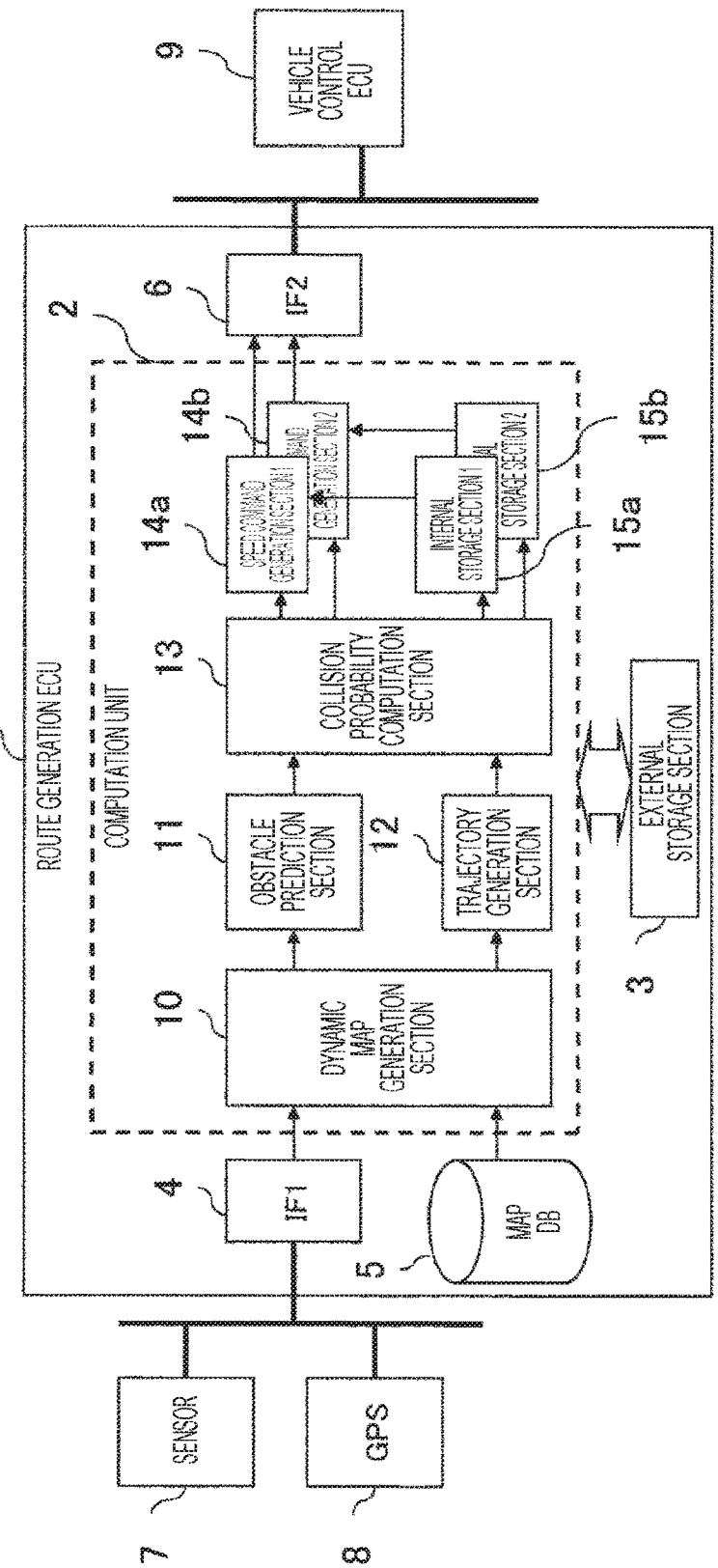
FIG. 10 is an overall block diagram of a travel command generation device according to a third embodiment of the present invention.

FIG. 9 is a flowchart illustrating processing of the collision probability computation section (13) according to the second embodiment of the present invention. Note that the processing of the collision probability computation section (13) according to the second embodiment of the present invention is the same as that of the first embodiment except for processing step (90) and accordingly, the description of the same portions will be omitted.

In processing step (90), the end of the movement distance loop is determined. Since the maximum value of the movement distance of the host vehicle can be limited depending on the time, the maximum value N of the variable j of the movement distance loop is calculated so as to be proportional to the time as in N∝k·i. With the processing above, the number of times of a computation loop by the collision probability computation section (13) and the capacity of the collision probability table can be reduced, whereby the speed of the computation can be further enhanced.

Hereinafter, the configuration of a travel command generation device according to a third embodiment of the present invention will be described with reference to FIG. 9. Note that the configuration of the travel command generation device according to the third embodiment of the present invention is the same as that of the first embodiment except for speed command generation sections (14a) and (14b) and internal storage sections (15a) and (15b) and accordingly, the description of the same portions will be omitted.

The collision probability computation section (13) according to the third embodiment of the present invention generates a plurality of identical collision probability tables to save to an internal storage section 1 (15a) and an internal storage section 2 (15b).

Since parallel processing is performed using two sets of the speed command generation section 1 (14a) and the internal storage section 1 (15a), and the speed command generation section 2 (14b) and the internal storage section 2 (15b), it becomes possible to generate the speed command value at higher speed. Note that, although the degree of parallelism is set to two in this practical example, the degree of parallelism may be further raised in order to attain a predetermined performance.

REFERENCE SIGNS LIST

1 . . . Travel command generation device
2 . . . Computation unit
3 . . . External storage section
4 . . . IF 1
5 . . . Map DB
6 . . . IF 2
7 . . . Sensor
8 . . . GPS
9 . . . Vehicle control ECU

The invention claimed is:

1. A travel command generation device that generates, on the basis of an existence probability distribution for a plurality of obstacles, travel commands to avoid collision between the plurality of obstacles and a host vehicle, wherein on the basis of the existence probability distribution for the plurality of obstacles, a collision probability table is generated, for which a movement distance L on a fixed trajectory and a time T are input and the probabilities of collision between the plurality of obstacles and the host vehicle are output and, on the basis of the collision probability table, travel commands are generated to avoid collision between the plurality of obstacles and the host vehicle.

2. The travel command generation device according to claim 1, wherein in a method of generating the collision probability table, the collision probability table is obtained by, in a case where the movement distance L on the fixed trajectory and the time T are input, generating a host vehicle area S when the host vehicle moves by L on the fixed trajectory and calculating an integral value, or an average value, or a maximum value within the host vehicle area S in the existence probability distribution for the plurality of obstacles at the time T.

3. The travel command generation device according to claim 2, wherein in a method of generating the travel commands, each travel command is obtained by searching for a travel command that minimizes an integrated value or a maximum value in the collision probability table during a certain period.

4. The travel command generation device according to claim 3, wherein in a method of generating the travel commands, parallel processing is performed by providing a plurality of the collision probability tables.

5. The travel command generation device according to claim 2, wherein a range of the movement distance L on the fixed trajectory, which is the input of the collision probability table, is settled depending on the time T.

* * * * *